(12) United States Patent
Hausmann

(10) Patent No.: US 6,288,156 B1
(45) Date of Patent: Sep. 11, 2001

(54) CALENDERABLE THERMOPLASTIC POLYMER COMPOSITIONS

(75) Inventor: Karlheinz Hausmann, Auvernier (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/297,471

(22) PCT Filed: Aug. 19, 1998

(86) PCT No.: PCT/US98/17159

§ 371 Date: Apr. 29, 1999

§ 102(e) Date: Apr. 29, 1999

(87) PCT Pub. No.: WO99/11698

PCT Pub. Date: Mar. 11, 1999

(30) Foreign Application Priority Data

Sep. 1, 1997 (EP) .................................................. 97202670

(51) Int. Cl.$^7$ .............................. C08K 3/34; C08L 33/02; C08L 23/12
(52) U.S. Cl. ......................... 524/427; 524/423; 524/449; 524/451; 525/74; 525/208
(58) Field of Search ..................................... 524/423, 427, 524/449, 451, 504, 517; 525/74, 208

(56) References Cited

U.S. PATENT DOCUMENTS

| | | | |
|---|---|---|---|
| 4,871,810 | 10/1989 | Saltman | 525/133 |
| 4,945,005 | * 7/1990 | Aleckner | |
| 4,968,752 | 11/1990 | Kawamoto | 525/194 |
| 5,206,294 | 4/1993 | Dawson | 525/196 |
| 5,395,881 | 3/1995 | Spelthann | 525/63 |

FOREIGN PATENT DOCUMENTS

| | | |
|---|---|---|
| 0 382 849 | 8/1990 | (EP) . |
| 0 922 729 | 6/1999 | (EP) . |
| WO 93/09180 | 5/1993 | (WO) . |
| WO 99/19399 | 4/1999 | (WO) . |

OTHER PUBLICATIONS

Encyclopedia of Polymer Science and Engineering vol. 14 p. 411–415.*

* cited by examiner

Primary Examiner—David J. Buttner
(74) Attorney, Agent, or Firm—Craig H. Evans

(57) ABSTRACT

A thermoplastic polymer composition comprising
(a) 50–90 wt. % of a polymer blend comprising
  (i) 10–40 wt. % polypropylene
  (ii) 15–50 wt. % uncrosslinked ethylene propylene copolymer rubber having an ethylene content of 60–80 wt %,
  (iii) 20–60 wt. % of an ionomeric copolymer of ethylene and an α,β-unsaturated $C_3$–$C_8$ carboxylic acid, and
  (iv) 0.1–5 wt. % of a copolymer of ethylene and glycidyl acrylate or glycidyl methacrylate,
(b) 10–40 wt. % inorganic filler and
(c) 0–15 wt. % of an uncrosslinked ethylene propylene copolymer rubber having an ethylene content of 60–80 wt. % grafted with 0.01–5 wt. % of an α,β-unsaturated carboxylic acid or an anhydride thereof.

6 Claims, No Drawings

CALENDERABLE THERMOPLASTIC POLYMER COMPOSITIONS

BACKGROUND OF THE INVENTION

This invention relates to thermoplastic polymer compositions which are thermoformable, and to thermoformed articles made from such compositions.

The compositions of the present invention, which are halogen-free, are useful for making laminates, sheets and films, and for replacing polyvinyl chloride (PVC) resins in many of their tradition uses. In particular, compositions of the present invention, and thermoformed articles made therefrom, are suitable as PVC replacements in the automotive field. They may be used in the fabrication of interior sheating of automobiles, for example, in the instrument panel skins, door panels, roof liners and seat covers.

Automotive applications require certain properties in the resins, including good flexibility, low temperature properties, capability of providing a soft surface texture and grain retention: as well as good high temperature properties and low emissions associated with it in view of the extreme temperatures the interior of automobiles can reach on hot, sunny days.

Non-halogenated thermoplastic compositions having good high temperature properties are known in the art, for example the polyolefin/ionomer blends disclosed in U.S. Pat. No. 4,871,810, or the blends of partially crosslinked ethylene/α-olefin copolymers with reaction products of ethylene copolymer ionomers and olefin/epoxy copolymers, disclosed in U.S. Pat. No. 4,968,752. Such compositions, however, are deficient in softness.

The deficiencies of the prior art compositions have been largely overcome by a composition comprising a blend of polypropylene, ethylene copolymer ionomer resin, ethylene/ glycidyl acrylate or methacrylate copolymer, and uncrosslinked ethylene propylene rubber as described in U.S. Pat. No. 5,206,294. Such a blend has been proven suitable for most applications and it is characterized by good thermoformability and grain retention. These blends, however, are not calenderable. The presence of ionomer resin and ethylene/glycidyl acrylate or methacrylate copolymer leads to excessive sticking of the blend on metal rolls of the processing equipment. As certain processors are equipped only with calendering equipment. As certain processors are equipped only with calendering equipment (not with extrusion equipment) there is a commercial need for thermoplastic polymer blends suitable for making thermoformed articles by calendering, which articles demonstrate the requisite flexibility, temperature properties, capability of providing a soft surface texture and grain retention for automotive applications.

SUMMARY OF THE INVENTION

In accordance with the present invention, thermoplastic polymer compositions are provided comprising 50–90 wt. % of a polymer blend comprising
  (i) 10–40 wt. % polypropylene
  (ii) 15–50 wt. % uncrosslinked ethylene propylene copolymer rubber having an ethylene content of 60–80 wt. %,
  (iii) 20–60 wt. % of an ionomeric copolymer of ethylene and an α,β-unsaturated $C_3$–$C_8$ carboxylic acid, and
  (iv) 0.1–5 wt. % of a copolymer of ethylene and glycidyl acrylate or glycidyl methacrylate, (b) 10–40 wt. % inorganic filler and
(c) 0–15 wt. % of an uncrosslinked ethylene propylene copolymer rubber having an ethylene content of 60–80 wt. % grafted with 0.01–5 wt. % of an α, β-unsaturated carboxylic acid or an anhydride thereof.

These compositions exhibit excellent flexibility, temperature properties, capability of providing a soft surface texture and good grain retention. The present invention is also directed to thermoformed articles from such compositions, particularly instrument panel skins.

DETAILED DESCRIPTION OF THE INVENTION

The polymer blend component (component (a)) of the thermoplastic polymer composition of the present invention is present in amounts of 50–90 wt. %, preferably 55–85 wt. %.

The polypropylene component of the polymer blend (component (a)(i) consists of crystalline polypropylene and is intended to include in addition to the homopolymer those polymers that also contain minor amounts, usually not greater than 15 weight percent, of higher or lower α-olefins, e.g. those containing 3–8 carbon atoms, such as ethylene, butene, octene, etc. The polypropylene polymers useful in this invention have melt indices in the range of from about 0.07–30 dg/minute at 230° C./2.16 g, and are present in the blend in amounts of 10–40 wt. %, preferably 15 to 30 wt. %.

The uncrosslinked ethylene/propylene copolymer rubber (component (a)(ii) and which serves as the base of component (c)) may be an ethylene/propylene/nonconjugated diene copolymer (EPDM) or an ethylene/propylene copolymer (EPM). EPDMs are preferred as component (a)(ii); EPMs are preferred as the base of component (c). The uncrosslinked ethylene/propylene copolymer rubber contains about 60–80 wt. %, usually about 65–75 wt. % ethylene.

The nonconjugated dienes can contain from 6–22 carbon atoms having at least one readily polymerizable double bond. The amount of nonconjugated diene is generally from about 1–7 wt. %, usually 2–5 wt. %. EPDM copolymers that are especially preferred are ethylene/propylene/1.4-hexadiene, ethylene/propylene/dicyclopentadiene, ethylene/propylene/norbornene, ethylene/propylene/methylene-2-norbornene and ethylene/propylene/1,4-hexadiene/norbornadiene. It is preferred that the ethylene/propylene copolymer rubber are non-crosslinked. The ethylene/propylene copolymer rubber present as component (a)(ii) in the blend is present in amounts of 15–50 wt. %, preferably 15–40 wt. %.

The ionic copolymer of ethylene and an α,β-unsaturated $C_3$–$C_8$ carboxylic acid (component (a)(ii) optionally contains at least one softening comonomer that is copolymerizable with ethylene. Acrylic and methacrylic acids are preferred acid comonomers. The softening comonomer can be an alkyl acrylate selected from the group consisting of n-propyl-, n-butyl, n-octyl, 2-ethylhexyl-, and 2-methoxyethyl-acrylates. The preferred alkyl acrylates are n-butyl-, 2-ethylhexyl-, and 2-methoxyethyl-acrylates. The softening comonomer can also be an alkyl vinyl ether selected from the group consisting of n-butyl, n-hexyl, 2-ethylhexyl-, and 2-methoxyethyl-vinyl ether. The preferred alkyl vinyl ethers are n-butyl vinyl ether and n-hexyl vinyl ether. The coplymer is about 10 to 70% neutralized with metal ions selected from groups Ia, Ib, IIa, IIIa, IVa, VIb, and VIII of the Periodic Table of Elements such as sodium, potassium zinc, calcium, magnesium, lithium, aluminum, nickel, and chrominum. Preferably the copolymer has from about 35 to about 70% of the carboxylic acid groups ionized by neutralization with metal ions selected from the group consisting of sodium, potassium, zinc, calcium, and magnesium. The ionomeric copolymer is present in the blend in amounts of 20–60 wt. %, preferably 30–50 wt. %.

The copolymer of ethylene and glycidyl acrylate or ethylene and glycidyl methacrylate (component (a)(iv)) preferably contains copolymerized units of an alkyl acrylate or an alkyl methacrylate having 1–6 carbon atoms. The ethylene/glycidyl acrylate or ethylene/-glycidyl methacrylate copolymer contains 60–88 weight percent ethylene and 1–12 weight percent glycidyl acrylate or glycidyl methacrylate. Representative alkyl acrylates and alkyl methacrylates that are used in the copolymer include methyl acrylate, ethyl acrylate, propyl acrylate, n-butyl acrylate, isobutyl acrylate, hexyl acrylate, methyl methacrylate, ethyl methacrylate, propyl methacrylate, butyl methacrylate, and hexyl methacrylate. Ethyl acrylate is preferred and n-butyl acrylate is especially preferred.

The ethylene/glycidyl (meth)acrylate copolymer can be prepared by direct polymerization, for example, copolymerizing ethylene, an alkyl acrylate, and glycidyl methacrylate or glycidyl acrylate in the presence of a free-radical polymerization initiator at elevated temperatures, generally 100°–230° C., and at elevated pressures, i.e. 140–350 MPa. The most preferred ethylene/glycidyl(methacrylate copolymers that are used in this invention are copolymers of ethylene, ethyl acrylate, glycidyl methacrylate, and, especially, ethylene, n-butyl acrylate, and glycidyl methacrylate. The copolymer of ethylene and glycidyl acrylate or ethylene and glycidyl methacrylate is present in the blend in amounts of 0.1–5 weight %, preferably 2–5 weight %.

A wide range of particulate inorganic fillers (component (b)) may be used depending on the intended use of the composition and, if desired, a mixture of particulate inorganic fillers may be used. The particulate inorganic fillers is suitably a basic filler for example an oxide, a hydrated oxide, a hydroxide, a carbonate or a mixture thereof, and especially is predominantly on oxide, a hydrated oxide, a hydroxide or carbonate of a metal of group II or III, such as magnesium, calcium or aluminium or a mixture thereof. The particulate inorganic filler is typically a material of the type which is used as an intumescent filler for a plastic material. The inorganic filler may a hydroxycarbonate such as hydrated magnesium hydroxy carbonate which occurs naturally as hydromagnesite, a mixed carbonate such as magnesium-calcium carbonate or may be a mixture of two or more such materials. Preferred inorganic fillers are calcium carbonate, talc, mica and gypsum, more preferably calcium carbonate or talc. The inorganic filler will be present in the polymer blend in an amount of 10–40 wt. %. In cases where there is no component (c) present, there is preferably 20–40 wt. % inorganic filler present. In cases where component (c) is present, there is preferably 10–30% inorganic filler present.

The grafting monomer suitable for grafting the uncrosslinked ethylene propylene copolymer rubber (the resulting grafted rubber being component (c)) is at least one of α, β-ethylenically unsaturated carboxylic acids and anhydrides thereof, including derivatives of such acids and anhydrides, which may be mono-, di- or polycarboxylic acids, are acrylic acid, methacrylic acid, maleic acid, fumaric acid, itaconic acid, crotonic acid, itoconic anhyddride, maleic anhydride and substituted maleic anhydride e.g. dimethyl maleic anhydride. Examples of derivates of the unsaturated acids are salts, amides, imides and esters e.g. mono- and disodium maleate, acrylamide, maleimide and diethyl fumarate. Maleic anhydride is preferred. The amount of grafting will be 0.01–5 wt. %, preferably 0.1–3 wt. %, based upon the weight of the uncrosslinked ethylene propylene copolymer rubber in component (c). Grafting processes are known in the art. The melt viscosity of the grafted uncrosslinked ethylene propylene copolymer rubber is not restricted, however, most preferred is found if the meld index, measured at 2.16 kg and 190° is between 50 and 150 g/10 min. or if the melt flow index, measured at 2.16 kg and 280° C. is 5–30 g/ 10 min. The grafted uncrosslinked ethylene/propylene copolymer rubber will be present in the polymer composition in an amount of 0–15 wt. %, preferably 1 to 10 wt. %.

The thermoplastic polymer compositions of the present invention are generally prepared by melt blending the polymeric components under high shear conditions, for example in an extruder. The various ingredients may first be combined with one another e.g., in a pellet blend, or they may be combined with one another via simultaneous or separate metering of the various components. They may also be divided and blended in on or more passes into separate sections of the mixing equipment.

The resultant compositions may be thermoformed into a variety of articles, including sheets, or they may be molded into any desired shape. In particular, they may be thermoformed at high deep-draw ratios for use as instrument panel skins for automobiles. Excellent low temperature flexibility and high temperature resistance enables these compositions to be useful in applications wherein a wide range of temperature and abrasive conditions are encountered. In addition, as these compositions resist sticking to metal at elevated temperatures, e.g. 150–200° C., they can be used in processes in which hot polymer comes into pressure contact with hot metal rolls.

The invention can be further understood by the following examples in which parts and percentages are by weight unless otherwise indicated.

EXAMPLES

Sheets of thermoplastic polymer compositions are formed by blending a "salt and pepper" mixture of granules of polymers and fillers on a laboratory two mill for 3 min. at 170–190° C. The releasability of the sheets from the calender rolls of the mill are judged subjectively:

1=very good release—can be drawn off by hand

2=good release—similar to 1 by higher force required

3=poor release—doctor knife required for removal

4=very poor release—sticks entirely to the rolls and cannot be released at all as a continuous sheet Milled sheets removed from the rolls are pressed in a hydraulic press at 220° C. in order to prepare a 12 mm×12 mm×2 mm plaque on which tensile strength, elongation, secant modulus and hardness are determined according to DIN 57504

In addition, compositions are compounded in a 25 mm PRISM twin screw extruder. All ingredients are prepared as a "salt and pepper" blend and granulated after exiting the extruder. The granulate so obtained is melted on a two roll mill and blended at 190° C. to give a feedstock for a lab calender which is run at 180° C.

All compositions are based on the following thermoplastic polyolefin (TPO) composition (amounts given in wt. %)

| | |
|---|---|
| Polypropylene[1] | 20 |
| EPDM[2] | 44 |
| Zn Ionomer[3] | 32 |
| ENBAGMA[4] | 2 |
| Carbon black | 2 |

[1] melt index 4 g/10 min., ASTM D-1238, Condition L
[2] 70 wt. % ethylene/26 wt. % propylene/4 wt. % 1,4-hexadiene
[3] 29.5 wt. % ethylene/22 wt. % n-butyl acrylate/8.5 wt. % methacrylic acid, 45% neutralized with zinc
[4] 66.7 wt. % ethylene/28 wt. % n-butyl acrylate/5.3 wt. % glycidyl methacrylate To this formulation is added the following processing aids, iorganic fillers and other additives.

| Ingredient | Obtained from |
|---|---|
| Zinc stearate | Merck, Germany |
| MICROLINE A3 talc | Naintsch, Austria |
| EXTRA PUR CaCO$_3$ | Merck, Germany |
| Fusabond MF416D[5] | DuPont |
| Fusabond MD353D[6] | DuPont |
| MB50-002[7] | Dow-Corning |

[5] EPM grafted with maleic anhydride
[6] polypropylene grafted with maleic anhydride
[7] A masterbatch of 50 wt % silicone in polyethylene Compositions in wt % ('C'=comparative example; 'E'= inventive example)

| | C1 | C2 | C3 | E1 | E2 | E3 | E4 |
|---|---|---|---|---|---|---|---|
| TPO | 100 | 95 | 98 | 90 | 80 | 70 | 90 |
| MB50-002 | | 5 | | | | | |
| Zn Stearate | | | 2 | | | | |
| Talc A3 | | | | 10 | 20 | 30 | |
| CaCO$_3$ | | | | | | | 10 |
| Rating | 4 | 4 | 4 | 3 | 3 | 2 | 3 |

| | E5 | E6 | E7 | C4 | E8 | E9 | E10 |
|---|---|---|---|---|---|---|---|
| TPO | 70 | 75 | 75 | 65 | 75 | 70 | 56 |
| Zinc stearate | | | | | | | |
| Talc A3 | 10 | 10 | 20 | 15 | 15 | 25 | 15 |
| CaCO$_3$ | 15 | 15 | | 15 | | | 22 |
| Fusabond MF416D | 5 | | 5 | | 10 | 5 | 7 |
| Fusabond MD353D | | | | 5 | | | |
| Rating | 1 | 2 | 2 | 4 | 3 | 3 | 1 |

We have found that common processing aids such as silicons, and fluoropolymer processing aids such as PTFE micro-powder sold as ZONYL MP 1500 (available from DuPont) do not enhance calenderability in these formulations, although they have been proven to be effective in reducing sticking to metal and many other substances.

As is indicated by the test results, the inorganic fillers with the ionomer and ENBAGMA to reduce the adhesion to the metal rolls of the calender and the roll mill. Comparative Example C4 shows that grafted polypropylene does not lead to any improvement in terms of sticking to metal, and in fact, reverses the positive effect of the filler.

What is claimed is:

1. A thermoplastic polymer composition comprising
   (a) 50–90 wt. % of a polymer blend comprising
      (i) 10–40 wt. % polypropylene,
      (ii) 15–50 wt. % uncrosslinked ethylene propylene copolymer rubber having an ethylene content of 60–80 wt. %,
      (iii) 20–60 wt. % of an ionomeric copolymer of ethylene and an α, β-unsaturated $C_3$–$C_8$ carboxylic acid, and
      (iv) 0.1–5 wt. % of a copolymer of ethylene and glycidyl acrylate or glycidyl methacrylate.
   (b) 10–40 wt. % inorganic filler, and
   (c) 2–15 wt. % of an uncrosslinked ethylene propylene copolymer rubber having an ethylene content of 60–80 wt. % grafted with 0.01–5 wt. % of an α,β-unsaturated carboxylic acid or an anhydride thereof.

2. A thermoplastic polymer composition according to claim 1 wherein component (b) is selected from calcium carbonate, talc, mica and gypsum.

3. A thermoplastic polymer composition according to claim 1 wherein component (c) comprises 2 to 10 wt. % of the composition and is an ethylene/propylene/nonconjugated diene copolymer grafted with 0.1–3 wt. % maleic anhydride and has a melt flow index at 280° C/2.16 kg of 5–30 g/10 min.

4. A thermoplastic polymer composition according to claim 3 wherein component (b) comprises 10–30 wt. % calcium carbonate or talc.

5. A thermoformed article made from a composition according to any one of claims 1 to 4.

6. A thermoformed article according to claim 5 wherein the article is an instrument panel skin.

* * * * *